United States Patent [19]
Lloyd

[11] Patent Number: 5,283,729
[45] Date of Patent: Feb. 1, 1994

[54] TUNING ARRANGEMENT FOR TURNING THE CONTROL PARAMETERS OF A CONTROLLER

[75] Inventor: Sheldon G. Lloyd, Austin, Tex.

[73] Assignee: Fisher-Rosemount Systems, Inc., Austin, Tex.

[21] Appl. No.: 753,217

[22] Filed: Aug. 30, 1991

[51] Int. Cl.$^5$ .............................................. G05B 13/02
[52] U.S. Cl. .................................... 364/157; 364/162
[58] Field of Search .................................. 364/157–163

[56] References Cited

U.S. PATENT DOCUMENTS

| | | | |
|---|---|---|---|
| 3,506,896 | 4/1970 | Loos | 318/18 |
| 4,441,151 | 4/1984 | Hayashibe | 364/157 |
| 4,546,246 | 10/1985 | Hafner et al. | 364/153 |
| 4,549,123 | 10/1985 | Hagglund et al. | 318/610 |
| 4,646,226 | 2/1987 | Moon | 364/176 |
| 4,669,040 | 5/1987 | Pettit et al. | 364/157 |
| 4,754,391 | 6/1988 | Suzuki | 364/157 |
| 4,758,943 | 7/1988 | Aström et al. | 364/157 |
| 4,855,674 | 8/1989 | Murate et al. | 364/157 |

OTHER PUBLICATIONS

"A Frequency Domain Method for Automatic Tuning of Simple Feedback Loops", Karl Johan Astrom and Tore Hagglund, *Proceedings of 23rd Conference on Decision and Control*, LasVegas, Nev., Dec. 1984.
"Adaptive Systems in Control and Signal Processing 1986", K. J. Astrom and B. Wittenmark, Proceedings of the 2nd IFAC Workshop, Lund, Sweden, Jul. 1–3, 1986.
"Analysis of Non-Linear Control Systems," Graham and McRuer, John Wiley & Sons, New York and London, 1961.
"A New Method for Automatic Tuning of PID Control parameters", Tor Steinar Schei, *AutoPID*, Oct. 4, 1990.
"Process Lags in Automatic-Control Circuits", J. G. Ziegler and N. B. Nichols, *Transactions Of The A.S.M.E.*, Jul. 1943, pp. 433–444.
"Describing Functions and Their Applications", Thayler & Brown, *Feedback Control Systems*, Chapter 13, pp. 479–503.

*Primary Examiner*—Jerry Smith
*Assistant Examiner*—Jim Trammell
*Attorney, Agent, or Firm*—Marshall, O'Toole, Gerstein, Murray & Borun

[57] ABSTRACT

A system is provided for tuning at least one control parameter of a controller in a control loop wherein the system includes an oscillation function not in series with the controller for selectively causing the control loop to oscillate at a tuning frequency, while the controller is in control of the process. While oscillating at the tuning frequency, a tuner is responsive to the tuning gain of the control loop and its tuning frequency for determining control parameters for tuning the controller.

21 Claims, 6 Drawing Sheets

|  | $K_c$ | $T_i$ | $T_d$ |
|---|---|---|---|
| PI | $0.5 K_u$ | $P/1.2$ | - |
| PID | $0.6 K_u$ | $P/2$ | $P/8$ |

ZIEGLER - NICHOLS
TUNING RULES $K_u = 4Y/\pi X$ = ULTIMATE GAIN
P = ULTIMATE PERIOD
$K_c$ = PROPORTIONAL GAIN
$T_i$ = INTEGRAL TIME CONSTANT
$T_d$ = DERIVATIVE TIME CONSTANT
X = INPUT AMPLITUDE TO NONLINEAR ELEMENT
Y = OUTPUT AMPLITUDE TO NONLINEAR ELEMENT

FIGURE 9A

|  | $K_c$ | $T_i$ | $T_d$ |
|---|---|---|---|
| SELF-REG | $0.4 K_u$ | $P/3$ | $P/12$ |
| NON-SELF REG | $0.4 K_u$ | $P$ | $P/2\pi$ |

ZIEGLER - NICHOLS
TUNING RULES $K_u = 4Y/\pi X$ = ULTIMATE GAIN
P = ULTIMATE PERIOD
$K_c$ = PROPORTIONAL GAIN
$T_i$ = INTEGRAL TIME CONSTANT
$T_d$ = DERIVATIVE TIME CONSTANT
X = INPUT AMPLITUDE TO NONLINEAR ELEMENT
Y = OUTPUT AMPLITUDE TO NONLINEAR ELEMENT

FIGURE 9B

AUTOTUNER FLOW CHART

TUNING ARRANGEMENT FOR TURNING THE CONTROL PARAMETERS OF A CONTROLLER

TECHNICAL FIELD

The present invention relates to a system and/or method for tuning a controller in a closed loop process, while the controller remains in control of the process. More specifically, it relates to a tuning system and/or method that introduces an excitation in the closed loop, causing the process to oscillate in a controlled manner so that appropriate control parameters can be determined for tuning the controller.

Two standard techniques for manual tuning of PID controllers were introduced in 1942 by Ziegler and Nichols in their article entitled "Optimum Settings for Automatic Controllers," vol. 64, pages 759–768, Transactions ASME. Although there have been numerous variations, the basic ideas survive in current practice. In one method, relating to open loop tuning of PID controllers, a step change in a process variable is introduced into the process while all other influences are kept to a minimum. An observed steady state gain of the process and the slope of a resulting response curve are then used to compute new proportional, integral, and derivative (PID) tuning parameters for the controller. This method has often been referred to as the reaction curve method and has the advantages of minimal disturbance to the process and of providing results in approximately one process period.

In an alternative method, the tuning of the PID controller is accomplished while the process loop is closed. The Ziegler and Nichols approach requires setting the controller for proportional operation only. The controller gain is then gradually increased manually until a condition of nearly neutral stability is reached; that is, the system will oscillate but only to the extent that the system is just slightly divergent or convergent. The frequency of oscillation under this condition is known as the critical frequency of the loop. At the critical frequency, the new controller parameters are calculated using the determined controller gain and the period of oscillation. This method is referred to as the ultimate gain method and tends to give more reliable results than the reaction curve method mentioned above. This method, however, requires several oscillations of the system and, while these oscillations are normally of quite low amplitudes, the process undergoes disruption for a longer duration.

Automating the ultimate gain method adds other difficulties. The task of increasing the proportional gain to achieve neutral stability, while at the same time providing an oscillation amplitude above the noise level, is not easy. In addition, the noneffective control time of the process required to find the appropriate gain is more substantial.

In some automated tuning systems, a nonlinear element, typically a relay switch, is commonly used to cause the process loop (a quasi-linear process) to oscillate. The relay may or may not have hysteresis. Using a relay to cause the process loop to oscillate has the advantages that the gain of the relay depends only upon the relay input and not upon frequency, and the oscillation amplitude is limited by the output amplitude of the relay.

The closed loop system is analyzed by representing the frequency dependent linear components of the loop with an appropriate transfer function. The nonlinear element, i.e., the relay, is represented by a pseudo transfer function consisting of the ratio of the Laplace transform of the fundamental harmonic of the output of the nonlinear element to the Laplace transform of its sinusoidal input. This expression is hereinafter called the describing function and has been disclosed by Thayler and Brown in "Analysis and Design of Feedback Control Systems," pages 479–503, McGraw Hill, New York, 1960, and by Graham and McRuer in "Analysis of Non-Linear Control Systems," John Wiley & Sons, New York and London, 1961. Though not limited to such conditions, the describing function is usually applied only to nonlinearities, which are not frequency dependent.

Analysis typically proceeds graphically by means of a modified Nyquist or Nichols chart. In the case of relay controlled systems, the loop oscillates at a stable amplitude called "a limit cycle." Standard analytical techniques allow the prediction of the gain of the linear portion of the loop and of the period of oscillation. If this nonlinearity is replaced with a linear element of equivalent gain, the resulting all linear loop will oscillate at very nearly the same frequency. The values of this gain and frequency are then be used to calculate the proper PID parameters for the PID controller.

An example of a system utilizing the above relay control techniques to automate the ultimate gain tuning method of Ziegler and Nichols is described in U.S. Pat. No. 4,549,123 issued to Hagglund and Astrom. As shown in FIG. 1, in which the system described in this patent is redrawn, a control loop 10 includes a nonlinear element 11 (i.e., a relay) and a controller 12 that can be alternatively switched in series with a process 14 via switches 15a and 15b. The controller 12 is represented by a transfer function $G_c(s)$ and the nonlinear element 11 is represented by a describing function N. Feedback is provided by connecting the output of the process 14 or process variable (PV) to a summer 13 to compare the process variable with a controlled variable or setpoint (SP). A signal representing the difference between the process variable and the set point (typically referred to as an error signal) is fed to either the nonlinear element 11 or the controller 12, depending on whether the system is operating during a tuning interval or controlling the process.

Even though the controller may be well tuned initially, periodic tuning may be necessary because the process can change due to aging, varying load or operating conditions or other causes. With sufficient change, the loop will operate at other than optimum performance and, may become unstable.

To retune the controller 12, the nonlinear element 11 is switched in series with process 14 causing the loop to oscillate at a frequency which is very nearly equal to its critical frequency and at an amplitude limited by the output amplitude of the relay. The limit cycle of the loop is defined by the following equations:

$$NG_p(s) = -1.0, \quad (1)$$

$$G_p(s) = -1/N, \quad (2)$$

$$N = 4Y/\pi X \quad (3)$$

where N is the describing function for a relay without hysteresis, $G_p(s)$ is the process transfer function, Y is the amplitude of the relay output, and X is the amplitude of the relay input. Since the loop gain is unity, the process gain can be taken as the inverse of the describing function for the existing amplitude conditions. Also, the period of oscillation can be measured directly. This information allows the PID parameters of controller 12 to be determined so that controller 12 can be tuned for proper control of process 14. Once this information is obtained, the relay 11 is disabled by switches 15a and 15b and controller 12, with new tuning parameters, is enabled to control the process 14.

The method described above and illustrated in FIG. 1 is fast and simple. However, during the tuning interval, the controller is disconnected, and the process is under a control range limited by the fixed amplitude of the relay output. If a disturbance, such as a load disturbance, requires corrective action greater than the output of the relay, the process cannot be corrected. In this event, the relay remains in one state and the tuning procedure must be aborted.

An alternative approach is illustrated in FIG. 2 and is the subject of U.S. Pat. No. 4,754,391 issued to Suzuki. According to this approach, a PID controller 16 is only partially in control of a process during the tuning interval. During this interval, a nonlinear element 18 is switched into series with a proportional control element 20 of the controller 16 via switches 19a and 19b, and a derivative control 24 is switched out of operation via switches 25a and 25b. Only an integral control element 22 is left to control the process 26 during the tuning interval.

This system will, in most instances, result in a limited amplitude oscillation, but not at the critical frequency. During tuning, the system can be defined by the following equation:

$$(K_c N + 1/T_i s) G_p(s) = -1.0 \quad (4)$$

where $K_c$ is the proportional gain of the controller, N is the nonlinear describing function, $T_i$ is the integration control parameter, $G_p(s)$ is the transfer function of the process, and s is the Laplace operator. This equation can be rearranged to separate the linear frequency dependent terms on the left side of the equality sign and the nonlinear amplitude dependent term on the right, as shown in equation 5 below.

$$K_c G_p(s) T_i s / (G_p(s) + T_i s) = -1/N \quad (5)$$

During a limit cycle, the presence of $T_i s$ in the numerator will shift the frequency of oscillation from the critical frequency of the control loop, by adding $+90°$. The presence of the $T_i s$ term in the denominator will tend to offset this by adding phase lag which will be in the range of $0°$ to $-90°$, depending on the relationship between $T_i s$ and $G_p(s)$. If the integral mode is tuned to provide control action, the phase shift introduced by the $T_i s$ terms will result in an oscillation having a frequency that is significantly different than the critical frequency of the control loop. Control data are determined by correlating gains at those frequencies to the gain at the true critical frequency. This is accomplished in Suzuki by making the very limiting assumption that the process transfer function can be defined as $$G_p(s) = K e^{-Ls}/Ts. \quad (6)$$

In some cases, this assumption may be valid. However, for comparison, a common process consisting of liquid level control with a displacement type of measurement has for its transfer function $$G_p(s) = K_p / \{s[(s/\omega)^2 + 2\xi/\omega + 1.0]\}. \quad (7)$$

The Nyquist curves for equations (6) and (7) are shown in FIG. 3. Tuning parameters calculated according to equation (5) from the off-resonance, frequency indicated by point (a), would be identical for the systems according to each equation (6) and (7). The system represented by equation (6) is stable, whereas the system represented by equation (7) is severely unstable. If the data were taken at the critical frequency, however, as indicated by points (b) and (c), the tuning parameters would be dramatically different to stabilize both systems. Thus, off-resonance tuning introduces a layer of uncertainty. This uncertainty arising from assuming how the process would behave at resonance using data acquired at a frequency other than at the critical frequency. Also, with only the integral control element 22 left in control of process 26 during the tuning interval, a large disturbance occurring during the tuning process would result in a relatively slow control response. This is because integral action is inherently slow. In addition, for some non-self-regulating processes, the system shown in Suzuki can become unstable during tuning. It should be noted that the only way that Suzuki can be made to tune a process described by equation (7) is to disengage the integral element 22 during tuning. This disconnection would results in a system that is similar to the Hagglund and Astrom's system described above.

SUMMARY OF THE INVENTION

The present invention features a system for automatically tuning a controller in a closed loop process by introducing an excitation in the closed loop which causes the process to oscillate in a controlled manner. While the oscillating in a controlled manner, the controller remains in control of the process. Characteristics of the process are then measured and data obtained to determine the appropriate control parameters for tuning the controller.

According to the present invention, the controller can be automatically tuned by connecting a tuning loop, having a nonlinear element, with a control loop causing it to oscillate. The control loop includes the controller and the process. The tuning loop can be arranged such that the nonlinear element is selectively operated in parallel with the controller or as feedback to the controller from the process. Either arrangement allows the controller to remain in continuous control of the process.

The key to either arrangement is that both the control loop and the tuning loop oscillate at same critical frequency, while the controller is in control of the process. This allows for the automatic determination of new tuning parameters to tune the controller. In the preferred embodiment, the control loop is oscillated at the critical frequency at which the control loop has a phase of $-180$ degrees.

The appropriate control parameters (proportional, integral, and derivative) necessary to tune the controller for the present process can be determined in one of two ways. The tuning loop can be connected with the control loop while the controller is operating in the proportional mode only. The process gain is then determined and the period of oscillation is measured at the critical frequency. Once this data is known, tuning rules, such as Ziegler and Nichols tuning rules, are used to determine new control parameters for the controller. These new control parameters may be manually or automatically applied to update the controller.

In the alternative, the phase contribution of the controller is adjusted to zero at the critical frequency while all of the control parameters are active. This is accomplished by measuring the phase across the controller and adjusting the derivative control parameter to nullify the phase contributions of the integrator and the derivative control parameters of the controller. The results as similar to determining the new tuning parameters using the proportional mode only.

BRIEF DESCRIPTION OF THE DRAWINGS

These and other features and advantages will become more apparent from a detailed consideration of the invention when taken in conjunction with the drawings in which:

FIGS. 9a and 9b are tables showing two possible sets of calculations for the proportional, integral and derivative parameters of a PID controller for purposes of tuning the controller;

DETAILED DESCRIPTION

According to the present invention, data used to calculate tuning parameters during a tuning interval are obtained while a controller is in control of the process. New control parameters for the controller can be obtained in one of two way. The process can be controlled using the proportional mode only during tuning or all of the control parameters can remain active during tuning, if the derivative parameter is adjusted to compensate for the phase contribution of integral and the derivative operating mode of the controller. Further, data are obtained when the process loop oscillates at the critical frequency, which eliminates errors that could be caused by measuring and correlating gains at other frequencies.

Oscillating the process loop at the critical frequency is accomplished by injecting a perturbing signal into a process control loop using a nonlinear element such as a relay switch. The nonlinear element, placed in communication with the control loop, is not placed in series with the controller. This arrangement allows the process loop to oscillate at the critical frequency, while the controller is in control of the process.

Figure 1:
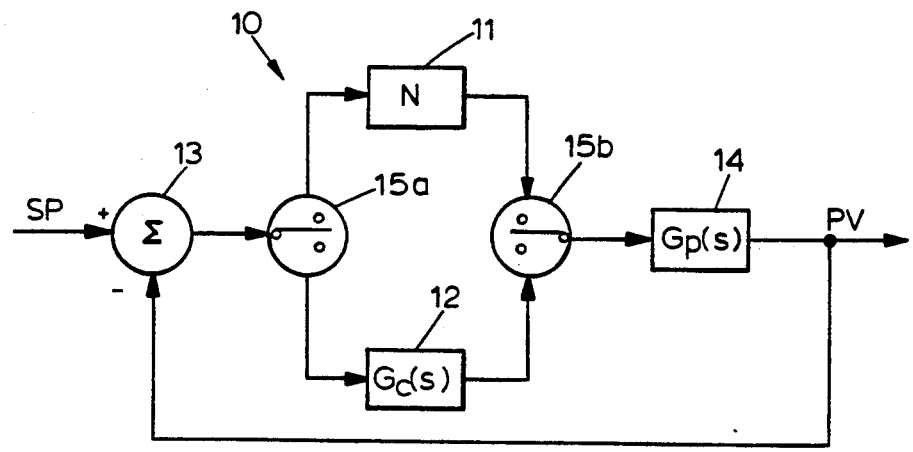
FIG. 1 shows a prior art system for tuning parameters of a controller.
Figure 2:
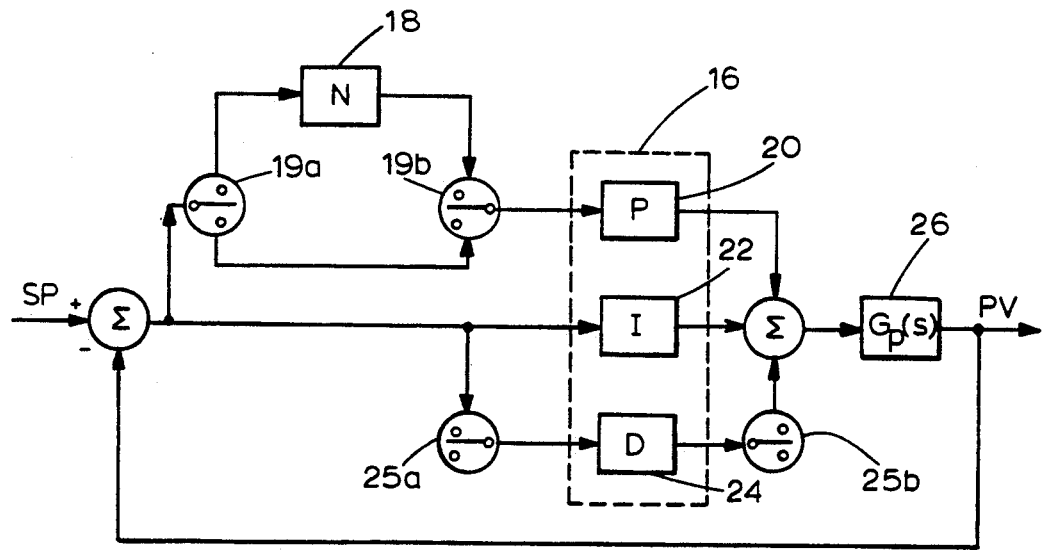
FIG. 2 shows another prior art system for tuning parameters of a controller.
Figure 3:
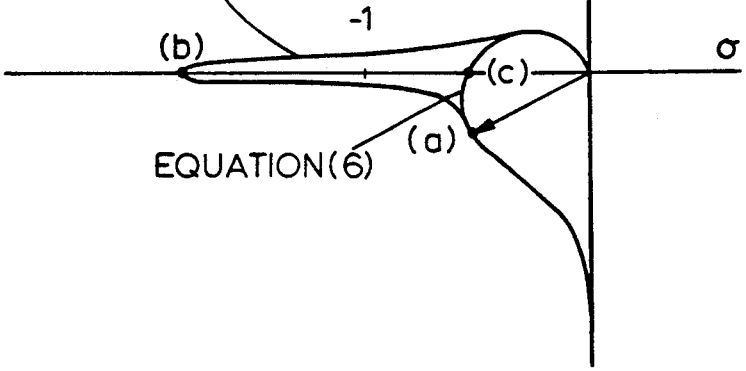
FIG. 3 illustrates a Nyquist chart useful in consideration of the system shown in FIG. 2.
Figure 4:
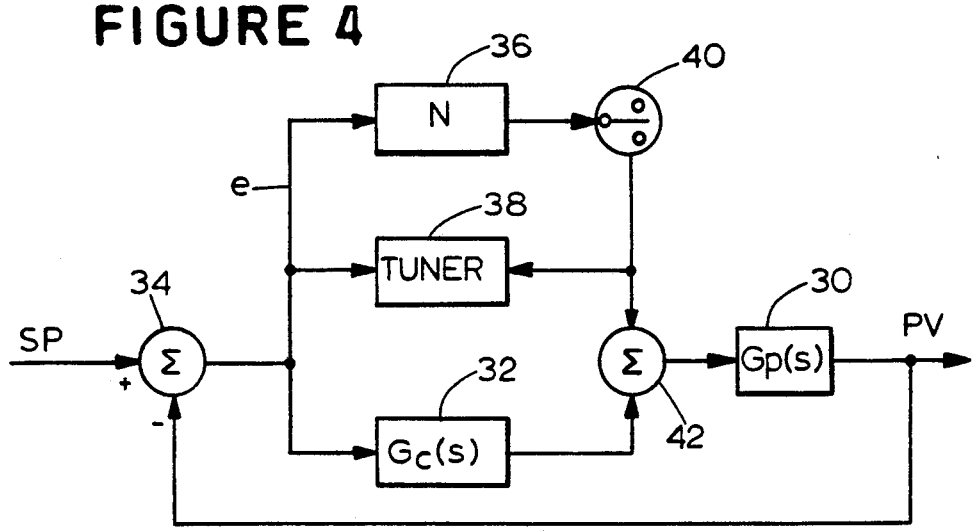
FIG. 4 shows one embodiment of the invention in which an oscillator causes the control loop including a controller and a process to oscillate for purposes of tuning the controller.

Referring now to FIG. 4, the system of the present invention includes a process 30 that is controlled by a controller 32 according to a set point (SP). A process variable (PV), which is indicative of the process, is fed back to a summer 34 and compared with the set point for generating an error signal (e). This error signal is then supplied to the controller 32, a nonlinear element 36, and a tuner 38. Note that process 30 and controller 32 are represented by transfer functions $G_p(s)$ and $G_c(s)$, respectively. The nonlinear element 36 is represented as a describing function N. For the purpose of this discussion, the controller 32 and process 30 can be thought of as operating in one loop referred to as the control loop, and nonlinear element 36 and process 30 can be thought of as operating in another loop referred to as the tuning loop.

Generally, the controller is tuned by selectively combining the output of the nonlinear element 36 with the output of the controller 32, using switch 40 and summer 42. Otherwise, when the controller is not being tuned, the nonlinear element 36 is disconnected from the operating system. Tuner 38 primarily operates in parallel with nonlinear element 36, during tuning, to measure the period of the loop cycle and the amplitude of the input signal (error signal) supplied to the nonlinear element. No assumptions are made with regard to the process whose characteristics are unknown. Since the nonlinear element is selected for its gain characteristics, among other things previously mentioned, the signal gain across nonlinear element 36, and therefore the amplitude of the output signal, is already known. Based on these measurements, new tuning parameters are calculated by the tuner 38 and are then used to update the control parameters of the controller 32.

According to the preferred embodiment, tuning is accomplished in one of two ways. Both methods, described below, require tuning rules such as those shown in FIG. 9a, which presents the Ziegler and Nichols' Tuning Rules, or FIG. 9b, which shows two other sets of tuning rules. Selecting which of the two sets of tuning rules shown in FIG. 9b will depending upon whether the process is self-regulating or nonself-regulating as indicated. As known by one skilled in the art, a self regulating process is one that for some given disturbance there is a limited steady state response (usually by some internal mechanism).

Regardless of which tuning rule that is used, the controller will contributing about 10° lag for a PI controller and about 20° lead for a PID controller at the critical frequency. If uncorrected, these offsets will result in subsequent tuning operations occurring off-resonance. However, this phase shift across the controller can be directly measured by tuner 38 while tuning is in progress. Introducing correction factors to the tuning rules can assure that tuning occurs at the critical frequency. Specifically, the addition of a very small amount of derivative to a PI controller such that the derivative time constant $T_d$ is approximately equal, for example, to 1.0 to 10.0% of the integral time constant $T_i$ (depending on the characteristics of the loop), and for a PID controller a ratio of $T_i/T_d$ is equal, for example, to approximately 10.0 are normally sufficient to eliminate the phase contribution by the controller.

Analysis of the system and method for tuning the controller will now be described. When nonlinear element 36 is connected by switch 40 to summer 42, the circuit of FIG. 4 can be described by the following equation:

$$(N + G_c(s))G_p(s) = -1.0 \qquad (8)$$

where $G_p(s)$ is the controller transfer function, $G_p(s)$ is the process transfer function, and N is the nonlinear element. There are no restrictions or assumptions necessary regarding the process whose characteristics are unknown. According to one method, to accomplish auto tuning, the controller is initially placed in a proportional mode only and the nonlinear element 36 is connected by switch 40 to summer 42. The controller can now be represented by $$G_c(s) = K_c \qquad (9)$$

where $K_c$ is a proportional constant. The arrangement yields the following equation:

$$(N + K_c)G_p(s) = -1.0. \qquad (10)$$

Equation (10) can be rearranged as follows:

$$G_p(s) = -1/(K_c + N) \qquad (11)$$

which is the process gain exactly at the critical frequency. With the gain of the process loop known, tuning rules such as those shown in FIGS. 9a and 9b are used to determine new tuning parameters, which may be manually or automatically applied. Specifically, with X representing the input to nonlinear element 36 and Y representing its output, the proportionality constant $K_c$, used for the proportional control part of controller 32, may be determined. At critical frequency and with proportional control only, $$K_u G_p = -1.0 \qquad (12)$$

where $G_p$ is the gain of the process and $K_u$ is equivalent to the ultimate proportional gain of the controller. From equations (11) and (12)

$$K_u = K_c + N = K_c + 4Y/\pi X \qquad (13)$$

where $K_c$ is the previous proportional gain used during the tuning test. Also, the period of oscillation is measured and used to tune the integral and derivative control parameters $T_i$ and $T_d$, respectively. Tuning according to this method is relatively fast. If, however, a big upset occurs during tuning, correction will be for proportional only. Therefore, as an alternative, the controller can be tuned with all of the control parameters active at the expense of more time required for tuning.

According to this alternative method of tuning, the phase contribution of the controller is adjusted to zero. In other words, since the integral control parameter contributes a lag phase and the derivative control parameter contributes a lead phase, adjustments are need to make it appear as if the process was controlled by the proportional mode only. This is accomplished by measuring the phase across the controller and adjusting the derivative control parameter to nullify the phase contributions. Once this is accomplished, the same tuning rules shown in FIGS. 9a and 9b are used to determine the new tuning parameters. The result is identical to tuning the controller using the proportional mode only.

The only difference with this method is that tuning is done with all threee tuning parameters active.

Figure 5:
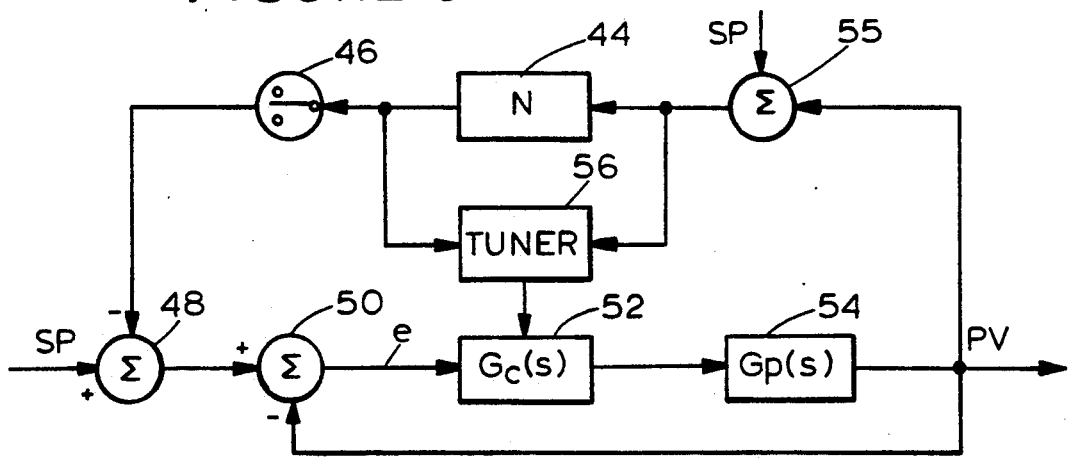
FIG. 5 shows an alternate embodiment of the present invention.

The arrangement of FIG. 5 provides an alternative method of on-resonance tuning while also simultaneously maintaining continuous control of the process. As shown, set point (SP) is selectively combined with the output of a nonlinear element 44 by switch 46 and summer 48. The nonlinear element 44 is a relay type of switch that is bistable having, for example, one output amplitude, if the error signal is positive, and a second amplitude, if the error signal is negative. The output of summer 48 is then combined with a process variable (PV) feedback signal by summer 50 to generate an error signal (e) which is fed to controller 52. Controller 52 thereafter generates an output control signal that controls process 54. The process variable is also combined with the set point by summer 55, and the combined signal is fed to nonlinear element 44 and tuner 56. Tuner 56 operates in parallel to nonlinear element 44 and is used to tune controller 52 and optimize the control loop.

For this embodiment, the linear loop containing the process 54, the controller 52 and the process variable feedback to summer 50 is defined as the control loop. The loop containing the controller 52, the process 54 and the nonlinear element 44 is defined as the tuning loop. As can be seen from FIG. 5, the nonlinear element 44 is selectively in communication with the control loop only as feedback. It, therefore, does not interfere with the control functions of controller 52, which remains in control of process 54 when nonlinear element 44 is applied to the control loop.

Figure 6:
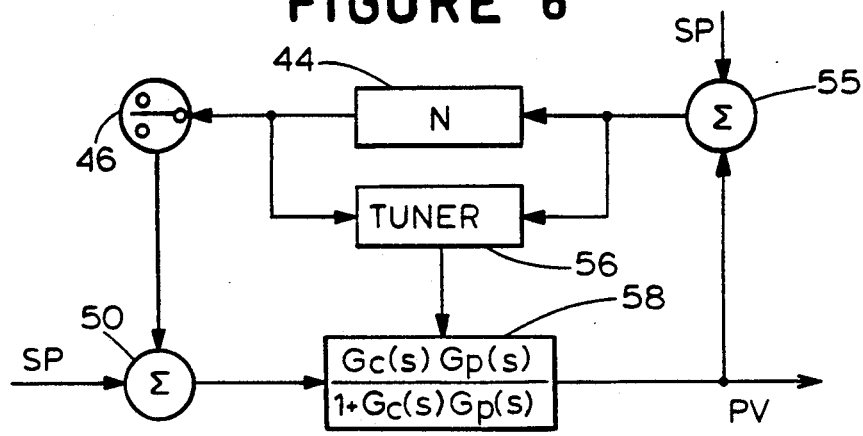
FIG. 6 is a simplified illustration of the system shown in FIG. 5.
Figure 7:
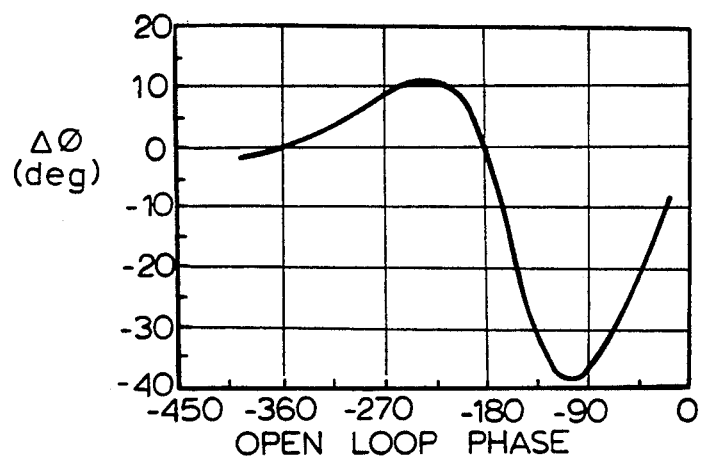
FIG. 7 is a chart illustrating loop phases of the system shown in FIG. 6.

For analysis of the system shown in FIG. 5, the control loop is simplified by expressing it as a transfer function, shown as a single block labeled 58 in FIG. 6. The key to this embodiment (as well as for the previously described embodiment) is that both the control loop and the tuning loop must have the same critical frequency. For this case, the result is that the open and closed loop phases of the control loop are equal only at the critical frequency and multiples thereof as is illustrated in FIG. 7.

Assuming no changes in the set point, and with nonlinear element 44 switched into the circuit, the conditions defining the limit cycle, i.e., critical frequency, are given by $$N[G_c(s)G_p(s)/(1.0 + G_c(s)G_p(s))] = -1.0. \qquad (14)$$

Equation 14 can be rewritten to place linear terms on one side of the equality and nonlinear terms on the other side as follows:

$$G_c(s)G_p(s)/(1.0 + G_c(s)G_p(s)) = -1/N. \qquad (15)$$

The system of FIG. 5, as is the case with the system of FIG. 4, can be tuned by tuner 56 according to the methods described above. That is, the controller can be tuned initially with proportional control of the process or by keeping all of the control functions of the controller active and altering the derivative term, $T_d$, to assure the phase contribution of the controller is zero.

In either case, the process gain at the critical frequency is given by the following expression:

$$G_p(S) = -1/K_c(N + 1.0). \qquad (16)$$

From equations (12) and (16), $$K_u = K_c(N+1.0) = K_c(4Y + \pi X)/\pi X \quad (17)$$

where $K_c$ is again the proportional gain existing during the current tuning interval, X is the amplitude of the signal into the nonlinear element and Y is the output amplitude of the signal leaving the nonlinear element. $K_u$ is the ultimate gain of the controller as previously discussed. The period of oscillation of the loop is also measured and used in accordance with the rules shown in FIGS. 9a or 9b to determining the new control function parameters $T_i$ and $T_d$.

In the above described systems, tuning is accomplished by switching the nonlinear element in communication with the control loop. For some processes, this switching and the introduction of an excitation to oscillate the process, during tuning, may cause objectionable disruptions in the process. These disruptions can be minimized so that the nonlinear element may remain active.

Figure 8:
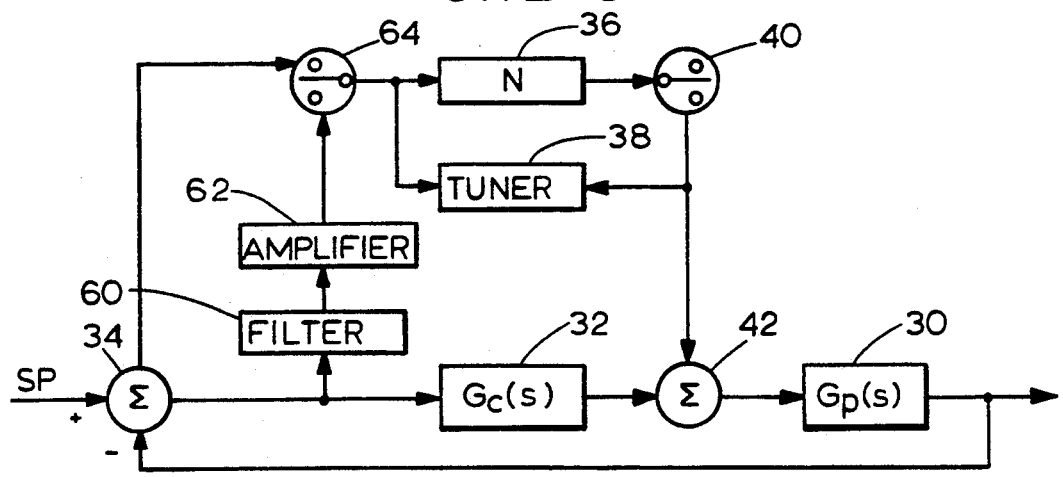
FIG. 8 shows an alternative embodiment of the present invention shown in FIG. 4 for reducing the effects of introducing a controlled perturbance in a process control loop.

Accordingly, a system which allows on-resonance tuning to occur, while the controller is fully active and permits continuous adaptive control, is shown in FIG. 8. This system is a modified version of FIG. 4 and includes a filter 60 and an amplifier 62 which may be switched into the tuning loop by a switch 64. A similar modification (not shown) can be made to the system shown in FIG. 5. Filter 60 is a dynamic filter which is centered on the critical frequency of the control loop, which can vary because of changes in operation or process conditions. Centering the filter can be accomplished because the period of oscillation is known when the loop is cycling at the critical frequency. The filter, which may be implemented in hardware or software, is designed to pass a selected band of frequencies and may, for example, have the following transfer function:

$$G_p(s) = Ks^n/(Ts+1.0)^{n+1.0} \quad (18)$$

where T is a time constant inversely proportional to the selected frequency for filter 60, K is the desired value of gain for filter 60, s is the Laplace operator, and n is dependent on how sharply defined the passband of filter 60 is. By amplifying the output of filter 60, the output signal of the nonlinear element can be substantially reduced such that its impact on the process can virtually go unnoticed. Operating under these conditions would allow the tuning loop to remain fully operational and allow the control parameters of the controller to be continually updated.

The analysis for determining the control function parameters $K_c$, $T_i$, and $T_d$ follows from the analysis provide above. Namely, the amplitude of the input and output signal of the nonlinear element and the period of the loop at the critical frequency are measured. These measurement are then used in conjunction with one of the tuning rules shown in FIGS. 9a and 9b to determine the new control parameters.

Figure 11:
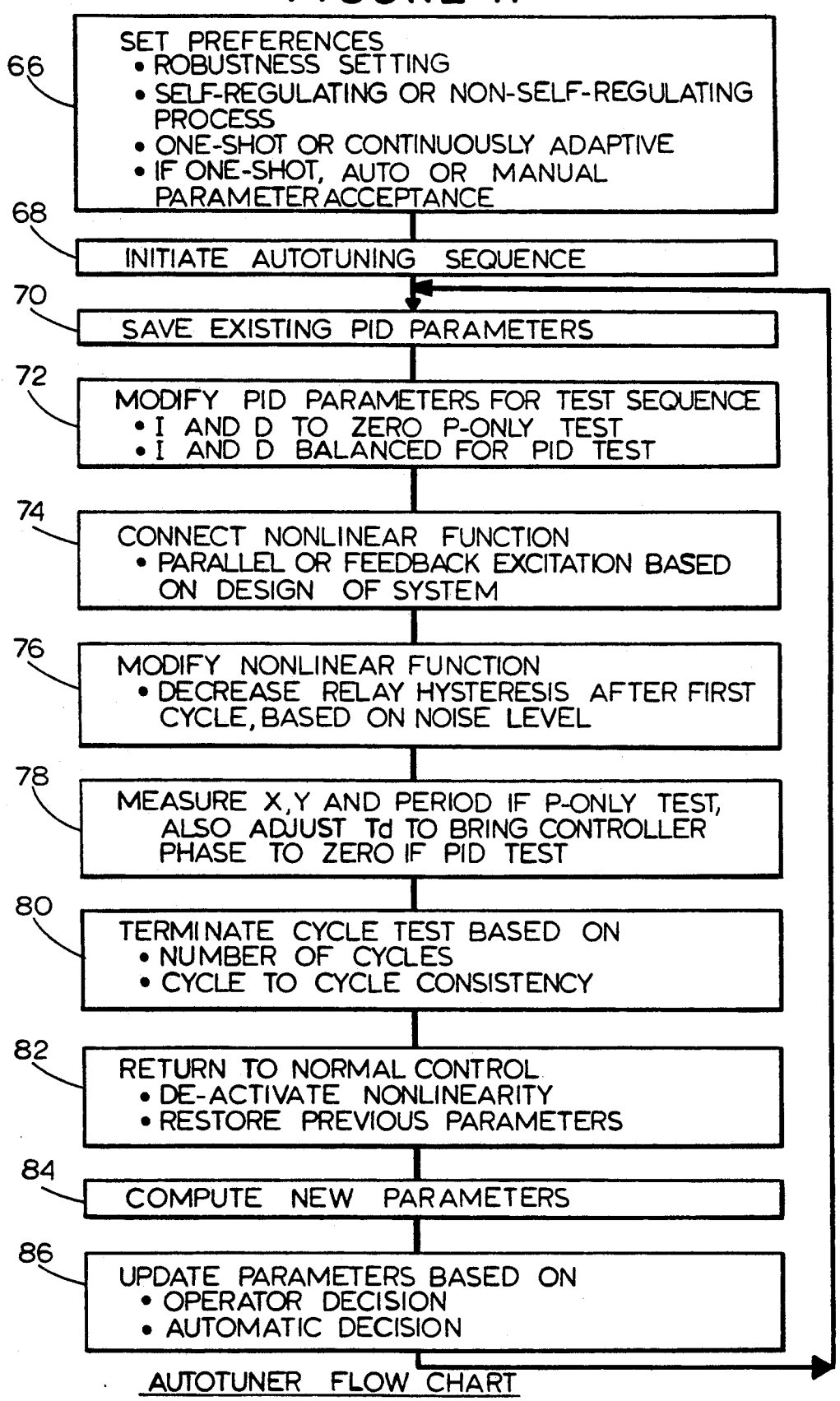
FIG. 11 is a flowchart illustrating the computer implementation of the systems shown in FIGS. 4, 5, and 8.

By way of an illustration, a flow diagram is provided (FIG. 11) and will now be described to show how this system may be controlled or implemented in software. Referring now to FIG. 11, certain control preferences are initially prescribed by the operator of the system, as shown in block 66. For example, the operator will set the robustness of the system. Aggressively tuned loops will respond more quickly to disturbances and set point changes, but are also more oscillatory and less tolerant of process changes. The degree of aggressiveness can be made adjustable by providing a robustness setting which alters the constants in the tuning rules in FIGS. 9a and 9b. For example, referring to FIG. 9b, using $K_c = 0.5/K_u$ is more aggressive, and $K_c = 0.3/K_u$ is less aggressive, than the value given in the table.

The operator must also indicate whether the process is self-regulating or non-self-regulating before tuning system is initiated so that appropriate tuning rules, as shown in FIG. 9b, are used. As previously mentioned, a self regulating process is one that for some given disturbance there is a limited steady state response (usually by some internal mechanism). The operator must then choose whether the control system selected to control the process should be selectively initiated by the operator, a one-shot tuning system, or a continuously adaptive system. In the preferred embodiment, if a one-shot type tuning system is selected, the operator will decide whether the control parameters should be adjusted automatically by the control system or merely displayed in order to allow the operator to make or accept the actual parameter adjustments.

Once the set control preferences are selected, block 66, the operator can initiate the tuning sequence either on a predetermined schedule or at the operator's request, as shown in block 68. Before beginning a tuning cycle which is described below, the existing controller parameters are saved, block 70. Saving these parameters allows the operator to restore the controller to its original state, if new tuning parameters as determined by the tuning cycle are not acceptable.

The controller is now tuned using one of the two methods described above. For the present discussion, a controller having only proportional control will be described below. For this method, the proportional parameter remains active and the integration and derivative control parameters are set to zero, block 72. (For the other method, all control parameters (P, I, and D) will remain active.) With just the proportional parameter active the nonlinear element is activated to oscillate the process loop at the critical frequency, block 74.

Preferably, the amplitude of the relay switch (the nonlinear element) can be adjusted or modified based on noise levels of the control loop, block 76. If the relay output level is within a noise band about the error signal, the relay will not cause reliable cycling of the loop. Thus, it is desirable to be able to adjust the relay switch so that its output is outside the noise band. It should also be noted that some process loops may require hysteresis in the relay in order to initiate oscillation. Once oscillation is initiated, this hysteresis may be removed. In some cases, hysteresis may also reduce the effects of noise caused by the relay switch.

At the critical frequency, the process gain and the critical period are determined and the appropriate tuning rules are used to tune the controller. As described above, this is accomplished by measuring the input X and output Y of the nonlinear function, and the period of oscillation, block 78. If an amplifier and filter is used for continuous tuning as shown in FIG. 8, the phase should also be measured in order to center the filter at the critical frequency.

After a preselected number of system cycles, or after sufficiently consistent cycles, the tuning cycle is terminated and the control system is returned to normal control, block 80. During the tuning interval, the first few oscillations do not produce valid data. Therefore, the system must be oscillated through a sufficient number of cycles until they the oscillation is consistent. For example, in the preferred embodiment the system is allowed to cycle until two successive cycles yield similar results. Thereafter, the nonlinear element is removed from the process loop and the controller relies on its previous parameters to control the process, block 82. In the meantime, new parameters are determined by referencing one of the tables shown in FIG. 9a or 9b, block 84. Once selected, the control functions will automatically be updated with the new parameters or will present the updated parameters to the operator for acceptance, block 86. In the preferred manual case, the operator can reject the new tuning parameters and retain the previous tuning values or insert new values.

In some applications, gain scheduling may also be a useful feature to ensure well tuned control over the entire operating range of the process. For instance, processes often exhibit high gain at the low end of the operating range and low gain at the upper operating range. For uniform stability over the entire operating range, different controller settings are required. For a wide range of operating conditions, a historical data base can be established by tuning at several operating levels and storing the results. These may then be referenced using a scheduling variable for identifying appropriate tuning parameters with out retuning. In other words, the controller could be operated in the future with a set of predetermined tuned parameters whose selection depends upon a scheduling variable. For example the scheduling variable may be the load variable. As the scheduling variable changes through its operating range, the controller can be operated with a sequence of tuned parameters designed to produce optimum control anywhere in the preconfigure range. Note, however, that other variables can be selected and used as a scheduling variable in the system to select appropriate tuning parameters. In another example, flow control (as sensed by a flow meter) often provides a suitable scheduling variable.

Figure 10A:
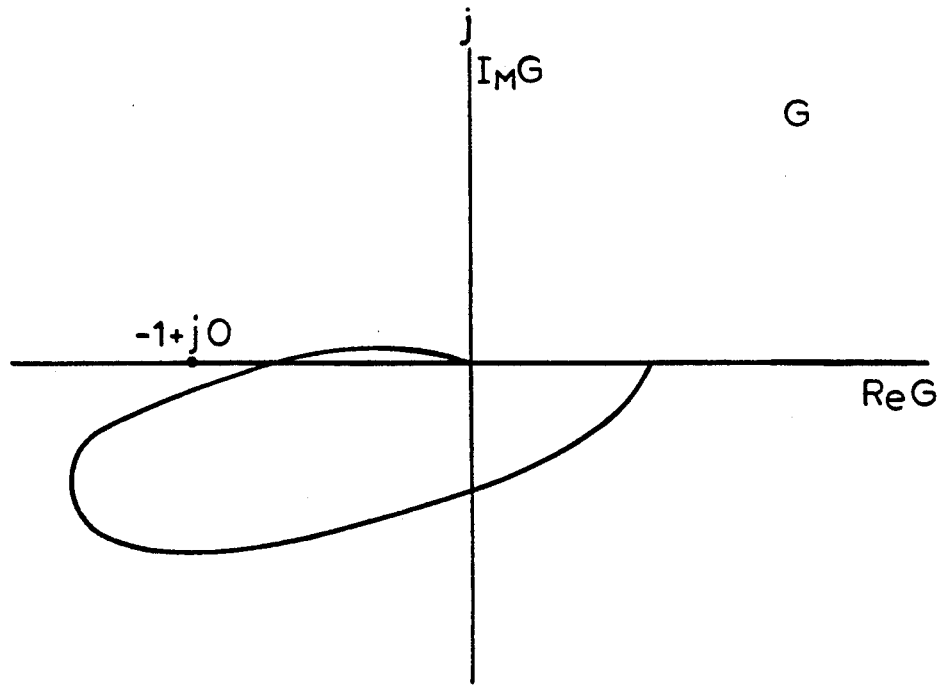
FIGS. 10a and 10b show Nyquist plots for two possible functions, both of which are stable, but with differing degrees of stabilities.
Figure 10B:
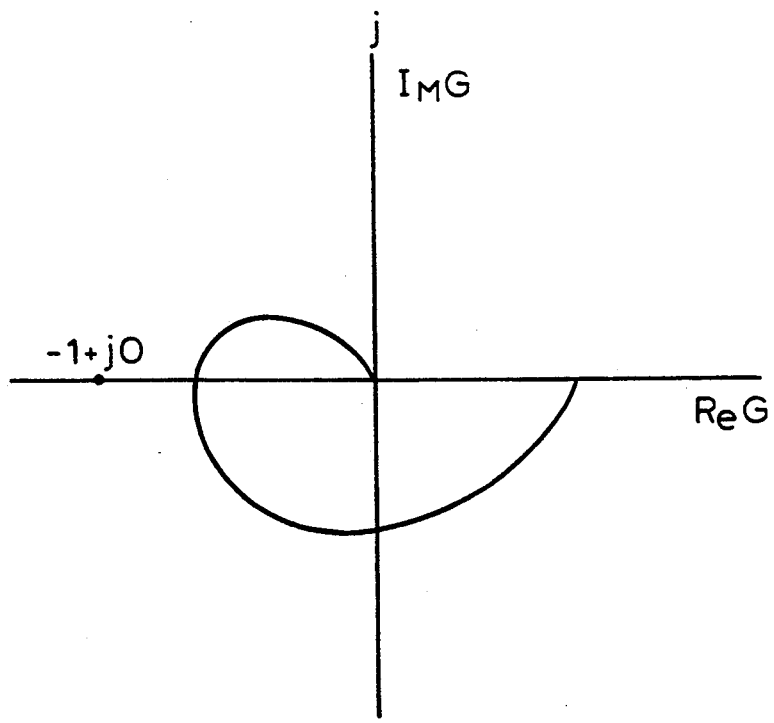

While this invention has been particularly shown and described with reference to preferred embodiments thereof, it will be understood by those skilled in the art that various changes in form and details may be made without departing from the spirit and scope of the invention as defined in the appended claims. For example, it may be desirable to test other points on the Nyquist plot at frequencies in addition to the critical frequency. As an illustration, the Nyquist plot may cross the negative real axis inside the $-1.0+j0$ coordinate (so that the loop is therefore stable) yet pass very close to the $-1.0+j0$ point as shown in FIG. 10a. The response of such a system may be quite oscillatory and will be more so the closer the curve comes to the $-1.0+j0$ point. By adjusting the phase of the controller (via the $T_i$ and $T_d$ settings) additional points on the Nyquist plot can be determined. Different tuning rules may also be employed, depending on different Nyquist curves.

What is claimed is:

1. A system for tuning for at least one control parameter of a controller means, said controller means operating in series with a process in a control loop and controlling said process in response to an error defined as the difference between a process variable and a set point, said system comprising:
   a tuning loop including oscillation causing means and said process, said oscillation causing means being outside of said control loop, said oscillation causing means for selectively causing said control loop to oscillate at a tuning frequency while said controller m is in control of said process, said control loop having a tuning gain while said control loop is oscillating at said tuning frequency; and,
   tuning means responsive to said tuning gain and to said tuning frequency for tuning said at least one control parameter.

2. The system of claim 1 wherein said oscillation causing means comprises nonlinear element means and wherein said control loop and said tuning loop are arranged so that said nonlinear element means is selectively operated in parallel with said controller means, said nonlinear element means having a nonlinear relay response.

3. The system of claim 1 wherein said oscillation causing means comprises nonlinear element means and wherein said control loop and said tuning loop are arranged so that said nonlinear element means is selectively operated as a feedback from said process to an input of said controller means, said nonlinear element means having a nonlinear relay response.

4. The system of claim 1 wherein said oscillation causing means comprises nonlinear element means having a nonlinear relay response.

5. The system of claim 4 wherein said nonlinear element means causes said control loop to oscillate at a critical frequency at which said control loop has a phase of $-180°$.

6. The system of claim 5 wherein said tuning means comprises gain scheduling means for selecting at least one of a plurality of tuned parameters dependent upon a scheduling variable, at least a different one of said plurality of tuned parameters corresponding respectively to a different one of a plurality of values of said scheduling variable, said controller means operating with said at least one selected tuned parameter.

7. The system of claim 5 wherein said control loop can be represented by a transfer function having a frequency dependent gain curve when it is plotted on a Nyquist chart and wherein said tuning means comprises means for selecting said frequency dependent gain curve such that every point of said frequency dependent gain curve is more than a predetermined distance away from a point $-1.0+j0.0$ on the chart.

8. The system of claim 5 wherein said control loop has a control loop phase and wherein said tuning means senses said control loop phase for adjusting said control loop phase so that said control loop phase is $-180°$.

9. The system of claim 5 wherein said tuning means comprises filter means for receiving said error and for providing a filter output having a response substantially centered upon said critical frequency, and amplifier means responsive to said filter output for driving said nonlinear element means so that said tuning means can continuously tune said controller means.

10. The system of claim 4 wherein said tuning means comprises filter means for receiving said error and for providing a filter output having a response substantially centered upon said tuning frequency, and amplifier means responsive to said filter output for driving said nonlinear element means so that said tuning means can continuously tune said at least one control parameter.

11. A system for tuning at least one control parameter of a controller means, said controller means operating in series with a process in a control loop and controlling said process in response to an error defined as the difference between a process variable and a set point, said system comprising:

nonlinear element means having a nonlinear relay response, said nonlinear elements means arranged to operate in parallel with said controller means for selectively causing said control loop to oscillate at a tuning frequency while said controller means is in control of said process, said control loop having a tuning gain while said control loop is oscillating at said tuning frequency; and tuning means responsive to said tuning gain and to said tuning frequency for tuning said at least one control parameter.

12. The system of claim 11 wherein said nonlinear element means causes said control loop to oscillate at a critical frequency at which said control loop has a phase of −180°.

13. The system of claim 11 wherein said tuning means comprises filter means for receiving said error and for providing a filter output having a response substantially centered upon said tuning frequency, and amplifier means responsive to said filter output for driving said nonlinear element means so that said tuning means can continuously tune said at least one control parameter.

14. A system for tuning at least one control parameter of a controller means, said controller means operating in series with a process in a control loop and controlling said process in response to an error between a process variable and a set point, said system comprising:

nonlinear element means having a nonlinear relay response, said nonlinear element means arranged to operate as a feedback from said process to an input of said controller means for selectively causing said control loop to oscillate at a tuning frequency while said controller means is in control of said process, said control loop having a tuning gain while said control loop is oscillating at said tuning frequency; and tuning means responsive to said tuning gain and to said tuning frequency for tuning said at least one parameter.

15. The system of claim 14 wherein said nonlinear element means causes said control loop to oscillate at a critical frequency at which said control loop has a phase of −180°.

16. The system of claim 14 wherein said tuning means comprises filter means for receiving said error and for providing a filter output having a response substantially centered upon said tuning frequency, and amplifier means responsive to said filter output for driving said nonlinear element means so that said tuning means can continuously tune said at least one control parameter.

17. A method for tuning at least one control parameter of a controller means, said controller means operating in series with a process in a control loop and controlling said process in response to an error defined as the difference between a process variable and a set point, said system comprising:

initiating an oscillation causing means, not in series with said controller means, for selectively causing said control loop to oscillate at a tuning frequency while said controller means is in control of said process, said control loop having a tuning gain while said control loop is oscillating at said tuning frequency; and activation a tuning means that is responsive to said tuning gain and to said tuning frequency for tuning said at least one control parameter.

18. The method of claim 17 wherein said oscillation causing means comprises nonlinear element means selectively operated in parallel with said controller means, said nonlinear element means having a nonlinear relay response.

19. The method of claim 17 wherein said oscillation causing means comprises nonlinear element means selectively operated as a feedback from said process to an input of said controller means, said nonlinear element means having a nonlinear relay response.

20. The method of claim 17 wherein said oscillation causing means comprises nonlinear element means having a nonlinear relay response.

21. The method of claim 20 wherein said nonlinear element means causes said control loop to oscillate at a critical frequency at which said control loop has a phase of −180°.

* * * * *

UNITED STATES PATENT AND TRADEMARK OFFICE
CERTIFICATE OF CORRECTION

PATENT NO. : 5,283,729
DATED : February 1, 1994
INVENTOR(S) : Sheldon G. Llyod

It is certified that error appears in the above-indentified patent and that said Letters Patent is hereby corrected as shown below:

Col. 7, line 7, "where $G_p(s)$" (first occurrence) should be --$G_c(s)$--.

Col. 9, equation (18), "where $G_p(s)$" should be --$G_f(s)$--.

Signed and Sealed this

Nineteenth Day of July, 1994

BRUCE LEHMAN

Attest:

Attesting Officer

Commissioner of Patents and Trademarks